(12) United States Patent
Ehrentraut et al.

(10) Patent No.: US 10,717,632 B2
(45) Date of Patent: Jul. 21, 2020

(54) BOLTING DEVICE

(71) Applicant: Manitowoc Crane Group France SAS, Dardilly (FR)

(72) Inventors: Nils Ehrentraut, Wilhelmshaven (DE); Arthur Haag, Rastede (DE)

(73) Assignee: Manitowoc Crane Group France SAS, Dardilly (FR)

( * ) Notice: Subject to any disclaimer, the term of this patent is extended or adjusted under 35 U.S.C. 154(b) by 96 days.

(21) Appl. No.: 15/878,846

(22) Filed: Jan. 24, 2018

(65) Prior Publication Data
US 2018/0244506 A1 Aug. 30, 2018

(30) Foreign Application Priority Data
Feb. 24, 2017 (DE) .................... 20 2017 101 042 U (51) Int. Cl.
*B66C 23/68* (2006.01)
*B66C 23/70* (2006.01)
(Continued)

(52) U.S. Cl.
CPC .............. *B66C 23/70* (2013.01); *B66C 23/64* (2013.01); *B66C 23/702* (2013.01); *F16B 7/18* (2013.01)

(58) Field of Classification Search
CPC ......... B66C 23/42; B66C 23/64; B66C 23/68; B66C 23/70; B66C 23/702; Y10T 403/29; Y10T 403/291; Y10T 403/293; Y10T 403/299; Y10T 403/32868; Y10T 403/32885; Y10T 403/591; Y10T 403/7062; Y10T 403/7067;
(Continued)

(56) References Cited

U.S. PATENT DOCUMENTS 1,769,332 A * 7/1930 Coffing ................. E04H 17/268
24/115 R
2,734,410 A * 2/1956 Gipperich ............... B25B 1/103
112/114

(Continued)

FOREIGN PATENT DOCUMENTS

CN 1809700 A 7/2006
CN 201193637 Y 2/2009
(Continued)

OTHER PUBLICATIONS

Office Action dated Mar. 4, 2019 issued in connection with corresponding Chinese Pat. Appl. No. 201810063501.2 and English translation of same.
(Continued)

*Primary Examiner* — Michael P Ferguson
(74) *Attorney, Agent, or Firm* — Levenfeld Pearlstein, LLC (57) ABSTRACT

The invention relates to a bolting device having two bolts which are held rotationally secure and coupled to each other via a spindle element, wherein: a first bolt is connected via a threaded engagement to a corresponding thread of the spindle element; rotating the spindle element about its central longitudinal axis causes the first bolt to move along the longitudinal axis; and a second bolt is rotationally mounted on the spindle element in a fixed axial position. The invention also relates to a crane jib head comprising such a bolting device, for bolting a lattice masthead to a head adaptor.

10 Claims, 4 Drawing Sheets

(51) Int. Cl.
*B66C 23/64* (2006.01)
*F16B 7/18* (2006.01)

(58) Field of Classification Search
CPC ..... Y10T 403/32598; Y10T 403/32861; Y10T 403/32893
See application file for complete search history.

(56) References Cited

U.S. PATENT DOCUMENTS

| | | |
|---|---|---|
| 4,141,455 A | 2/1979 | Henderson et al. |
| 6,036,035 A | 3/2000 | Asano et al. |
| 6,626,604 B1 * | 9/2003 | Pinarello ................ B62K 19/18 280/278 |
| 8,522,988 B2 | 9/2013 | Tanaka et al. |
| 2004/0104192 A1 | 6/2004 | Stowasser et al. |
| 2011/0147331 A1 | 6/2011 | Tanaka et al. |
| 2014/0231374 A1 | 8/2014 | Foust et al. |

FOREIGN PATENT DOCUMENTS

| | | | |
|---|---|---|---|
| CN | 102137809 A | 7/2011 | |
| DE | 3406548 * | 7/1985 | ............ F01D 25/26 |
| DE | 20007050 U1 | 8/2001 | |
| DE | 10100449 A1 | 10/2001 | |
| EP | 2769954 B1 | 11/2017 | |
| JP | 46-010832 Y | 4/1971 | |
| JP | S5128946 A | 3/1976 | |
| JP | H09278373 A | 10/1997 | |
| JP | 2001341981 A | 12/2001 | |
| JP | 2010059211 A | 3/2010 | |
| WO | WO 2012/151703 * | 11/2012 | ................ E02F 3/40 |

OTHER PUBLICATIONS

German Search Report dated Dec. 21, 2017 in corresponding German Patent Application 20 2017 101 042.2.
Extended European Search Report issued by ISA/EPO in connection with EP18152224 dated Jul. 25, 2018.

* cited by examiner

BOLTING DEVICE

CROSS-REFERENCE TO RELATED APPLICATION(S)

This application claims priority under 35 U.S.C. § 119(a) to German Patent Application No. 20 2017 101 042.2, filed on Feb. 24, 2017, the disclosure of which is incorporated by reference herein in its entirety.

FIELD

The present invention relates to a bolting device by means of which crane components are bolted to each other. The present invention also relates to a crane jib head comprising such a bolting device.

BACKGROUND

When fitting cranes, the individual crane components are usually connected to each other by means of bolts. One very widely-used solution is to hammer substantially cylindrical bolts into the dedicated receptacles in the components to be connected and/or hammer them out again after use. This very simple solution does however necessitate that the corresponding bolt receptacles be very easily reached for hammering, which can no longer always be achieved in ever more complex and compact designs. In order to enable bolting at inaccessible locations or in restricted spaces, bolting systems in which the bolts are hydraulically, pneumatically or mechanically pressed into or withdrawn again from their receptacles have proven to be of value.

Thus, for example, U.S. Pat. No. 8,522,988 B2, US 2004/0104192 A1, U.S. Pat. No. 4,141,455 B1 or DE 200 07 050 U1 show mechanical solutions in which two opposing bolts can be moved away from each other and thus pressed into corresponding bolt receptacles by means of rotating an element which lies between them and comprises a thread, whereas activating the element in reverse can drive the bolts out of their receptacles again. Common to all these solutions is that the central element lying between the bolts comprises two counter-rotating threads which mesh directly with the bolts or indirectly with coupling elements, such that when the element lying between the bolts is rotated, the bolts are moved away from each other or towards each other in a symmetrical movement.

Depending on the size of the bolted arrangement and the type of fit used for it, very large frictional forces may be generated at the points of contact between the bolts and the dedicated receptacles, wherein said forces can be additionally increased by any dirt or soiling. It is also not possible to completely exclude the possibility of the bolts "twisting" up to a certain degree with respect to each other, which additionally increases the forces necessary for moving the bolts.

SUMMARY

It is the object of the present invention to provide a mechanical bolting device in which the forces necessary for bolting and unbolting are reduced to a critical extent as compared to the previously known solutions.

The bolting device in accordance with the invention thus comprises two bolts which are held rotationally secure and coupled to each other via a spindle element, wherein: a first bolt is connected via a threaded engagement to a corresponding thread of the spindle element; rotating the spindle element about its central longitudinal axis causes the first bolt to move along the longitudinal axis; and a second bolt is rotationally mounted on the spindle element in a fixed axial position.

In other words, the bolting device in accordance with the invention comprises two bolts which cannot be rotated, contrary to a spindle which can be rotationally moved about its central longitudinal axis, i.e. the bolts are held rotationally fixed with respect to the rotating spindle. The aim of this arrangement is that the distance between the bolts is varied while the spindle rotates about its central longitudinal axis. Only one of the two bolts changes its axial position with respect to the spindle, however, by directly or indirectly meshing with a thread of the spindle and migrating parallel to or even on the central longitudinal axis when the spindle is rotated. The second bolt, by contrast, remains at its fixed axial position relative to the spindle when the spindle is rotated, since it is coupled to the spindle via a rotary bearing.

This alone demonstrates the advantage of the solution in accordance with the invention over the previously known solutions: whereas the solutions from the prior art employ counter-rotating threads so as to achieve a symmetrical movement of the bolts, the present invention specifically aims at an asymmetrical or "one-sided" movement of the bolts relative to the spindle element. Assuming that identical thread pitches are used, it follows from this that the change in distance between the bolts is halved, for a predetermined number of revolutions of the spindle, which in turn means that the moment necessary for this purpose, and which is to be applied via the spindle, is halved. As will yet be explained in more detail below, the activating forces necessary for bolting and unbolting are thus reduced to a critical extent.

In accordance with one preferred embodiment, the spindle element is then arranged coaxially with respect to the bolts, wherein the spindle element exhibits the same central longitudinal axis as the two substantially cylindrical bolts. It is then conceivable for the spindle element to be embodied in the manner of a sleeve which circumferentially encloses at least one bolt, wherein the bolt which can be translationally moved relative to the spindle element meshes with an inner thread of the sleeve. Conversely, however, it is equally conceivable for the spindle element to be embodied substantially as a threaded rod which enters at least one of the two bolts, wherein the bolt which can be translationally moved meshes with an outer thread of the threaded rod. In both cases, the bolt which is translationally fixed can be rotationally coupled to the spindle at one end of the spindle element. As an alternative to a coaxial spindle element, the spindle element can also be arranged offset with respect to the bolts which are for example arranged coaxially with respect to each other, although the bolts are then coupled to the spindle via corresponding intermediate elements which extend away from the spindle, for example radially.

In accordance with another preferred embodiment, the bolting device is floatingly mounted with respect to and in particular on at least one of the elements to be bolted. The bolting device can then remain on one of the elements to be bolted, for example after unbolting, wherein it is still ensured that the bolts are driven into and/or out of their corresponding receptacles on both sides, i.e. care should be taken, in accordance with the difference in frictional force between the opposing bolting locations, that the bolt which is subject to the lower frictional force is inserted and also withdrawn again first.

In accordance with another preferred embodiment of the present invention, the first bolt comprises a first holding element, and the second bolt comprises a second holding element, which hold the respective bolt rotationally secure with respect to the spindle element. These holding elements can also serve to floatingly mount the first bolt and the second bolt and therefore the entire bolting device with respect to at least one of the elements to be bolted. Such a holding element can thus for example extend radially away from the respective bolt and can be supported together with the bolt on a stationary structure, in order to prevent the bolt from rotating about its longitudinal axis. If, for example, such a stationary structure comprises an elongated hole which functions as a guiding slot and extends parallel to the longitudinal axis of the spindle, then a holding element which engages with the elongated hole can be supported on the side flanks of the elongated hole but still has a translational degree of freedom along the elongated hole.

In accordance with another embodiment, the first bolt comprises a first bushing which is connected, rotationally fixed, to the bolt and for its part provides a threaded engagement with a corresponding thread, in particular an outer thread, of the spindle element. In order to connect the bushing, rotationally fixed, to the bolt, it can for example be dowelled or screwed to the bolt or glued into the bolt. In the event of repairs, exchanging such a bushing is more cost-effective than exchanging the entire bolt, wherein if a suitable material is selected, for example a brass bushing, the running properties of the thread pairing provided between the bolt and the spindle element are improved and the actuating forces required are in turn reduced.

Similarly, the bolt rotationally mounted on the spindle can likewise comprise a bushing which is for example connected, rotationally fixed, to the spindle element. In this case, relative movement occurs between the bushing and the bolt.

The second bolt can also encompass the second bushing on both sides in the axial direction, such that the bushing can be supported on the bolt during the bolting and unbolting process.

For assembling the bolting device, the second bolt can comprise a cavity which extends in the radial direction and via which the bushing can be inserted into the bolt. Furthermore, the second bushing can also comprise an inner thread which corresponds to an outer thread, in particular the same outer thread, of the spindle element. Once the second bushing has been inserted into the second bolt, its position in the second bolt can be fixed such that the bushing only then exhibits one rotational degree of freedom. Additionally, the spindle element which is screwed into the second bushing can be fixed in the bushing, for example dowelled to it, wherein the spindle element together with the bushing can ultimately only then be rotated about its longitudinal axis relative to the second bolt and is fixed to the second bolt in its other degrees of freedom. The second bushing therefore has only one rotational degree of freedom with respect to the second bolt.

In order to avoid an overload on individual components, in particular the holding and guiding elements, the first bolt and/or second bolt can comprise a collar, in particular a radially circumferential collar, which can adjoin the bolting portion embodied to engage with the elements to be bolted, and can be supported in the maximally retracted position on one of the elements to be bolted.

Conversely, the bolts can be embodied such that they abut each other in a maximally converged position and thus prevent any further "unbolting movement" which could perhaps cause an overload on the holding and guiding elements.

In order to be able to rotate the spindle element about its longitudinal axis, at least one end of the spindle element can comprise a tool interface, for example in the form of an external hex, at which the spindle element can be engaged using a corresponding tool and induced to rotate, for example with the aid of a crank handle or motorised screwdriver. It is of course also conceivable for the spindle element to comprise such a tool interface at both ends, such that the bolting device can be activated from both sides. For this purpose, it is necessary to provide, for each tool interface, an access which for example extends centrally and in the axial direction through the corresponding bolt.

Another aspect of the present invention relates to a crane jib head comprising a bolting device such as has been described above. Such a bolting device can in particular be used when bolting individual components of the jib head, for example when bolting a lattice masthead to a head adaptor which couples the lattice masthead to the crane jib. In addition, the present invention also relates to a crane comprising a corresponding crane jib head or comprising a bolting device, such as has been described above, which serves to bolt crane components. It is in principle conceivable to bolt any crane components using the bolting device in accordance with the invention, including for example jib heads which are directly bolted to the jib and can for example be pivoted relative to the jib about a vertical axis for fitting purposes.

BRIEF DESCRIPTION OF THE DRAWINGS

In the following, the invention is explained in more detail on the basis of a preferred embodiment and by referring to the corresponding figures, which show.

DESCRIPTION

Jib heads have frequently been used in order for example to be able to operate a telescopic jib of a mobile crane beyond the upper edges of a building. Such a jib head is for example indicated by the reference sign 14 in FIG. 1. The jib head shown in FIG. 1 comprises a lattice mast structure, wherein its proximal end (on the left in FIG. 1) can be bolted in the horizontal direction to a head adaptor (not described in more detail) which can in turn be bolted to a telescopic jib (not shown) of a mobile crane. The luffing angle of the jib head 14 can be altered with respect to the telescopic jib by the hydraulic cylinders of the head adaptor.

Figure 1:
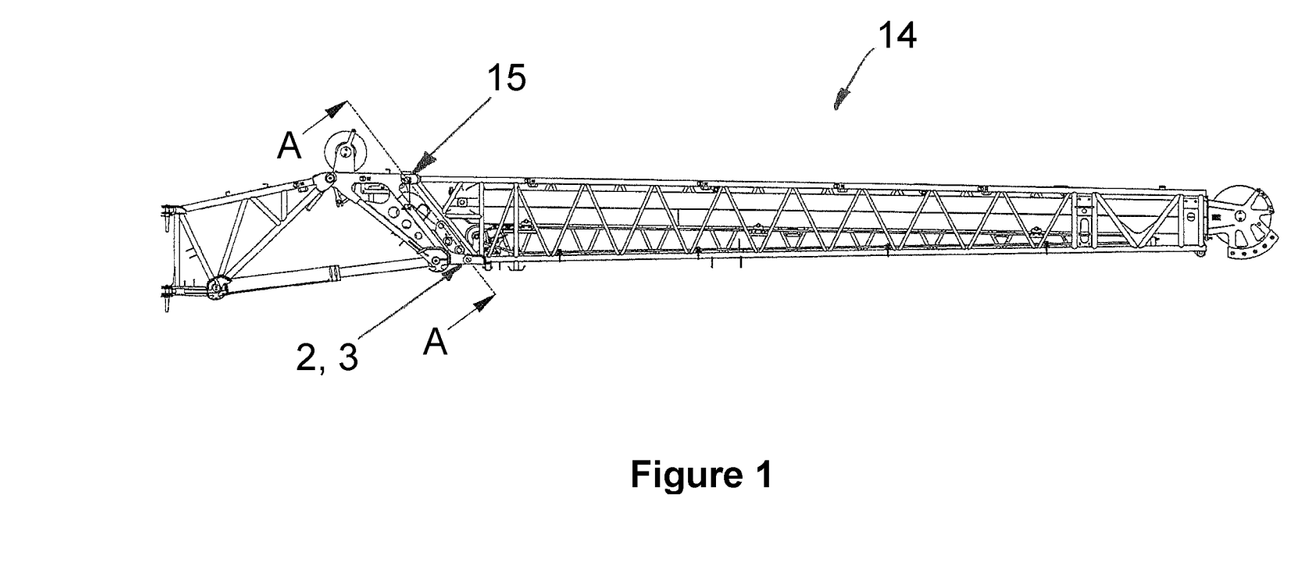
FIG. 1 a lattice masthead comprising the bolting device in accordance with the invention.

In order to bolt it to the head adaptor and therefore connect it to the telescopic jib, the lattice masthead 14 which may optionally be fitted comprises a bolting device in accordance with the invention comprising two opposing bolts 2 and 3. In the example shown, the bolting locations which lie above this, between the lattice masthead and the head adaptor, are bolted by means of ordinary bolts 15 which are hammered into their corresponding receptacles and out again. When fitting the jib head, the bolts 15 are hammered in first, whereupon the bolting device lying below them is activated. The conventional bolts 15 are used in the example shown because during dismantling, the final bolt is to be removed in a contactless manner for safety reasons, i.e. without anyone remaining in physical contact with crane components.

Figure 2:
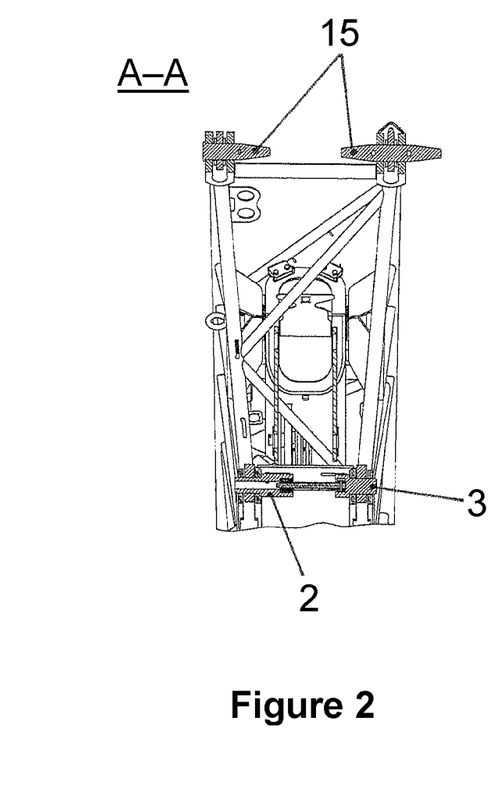
FIG. 2 a sectional view along the plane A-A from FIG. 1.

FIG. 2 shows a sectional view along the plane A-A from FIG. 1, which demonstrates how the upper bolts 15 are hammered in and driven out again in a conventional manner. At the lower two bolting locations, by contrast, the bolting device in accordance with the invention is used, in which two opposing bolts 2 and 3 are mechanically driven into their receptacles and out of them again.

Figure 3:
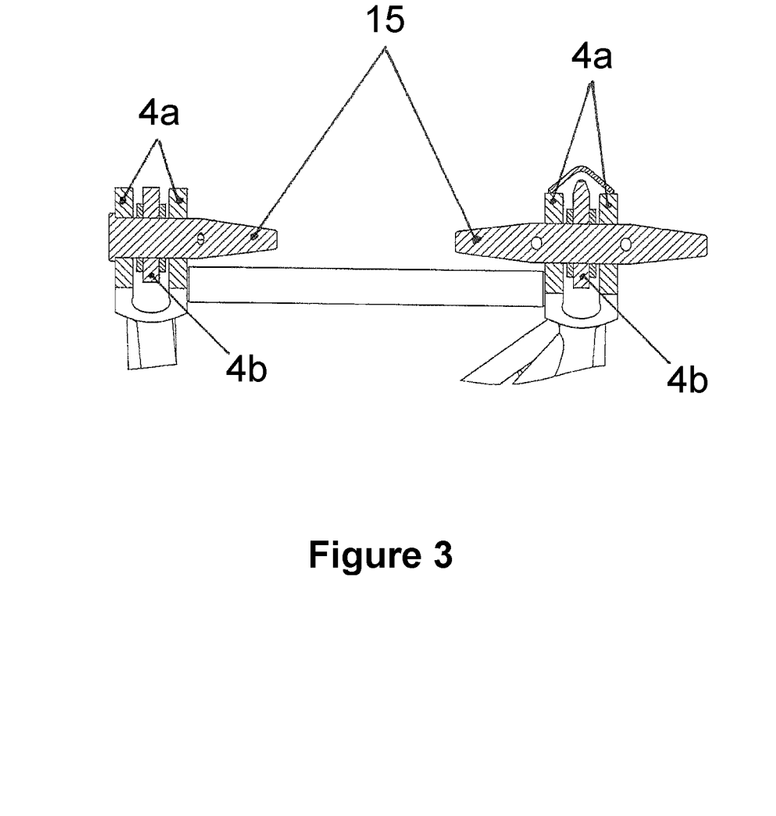
FIG. 3 a detailed view of the upper bolted arrangement from FIGS. 1 and 2.

FIG. 3 again shows, in more detail, the nature of the upper arrangement bolted by means of conventional bolts 15 which engage with corresponding receptacles of the crane components 4a and 4b to be connected. In the example shown, the bolts 15 are seated in corresponding receptacles which are respectively formed by the fork lugs of the element 4a and the rod lug of the element 4b. In the same way, the bolts 2 and 3 of the bolting device in accordance with the invention are seated in identically embodied receptacles, as will be described in the following.

Figure 4:
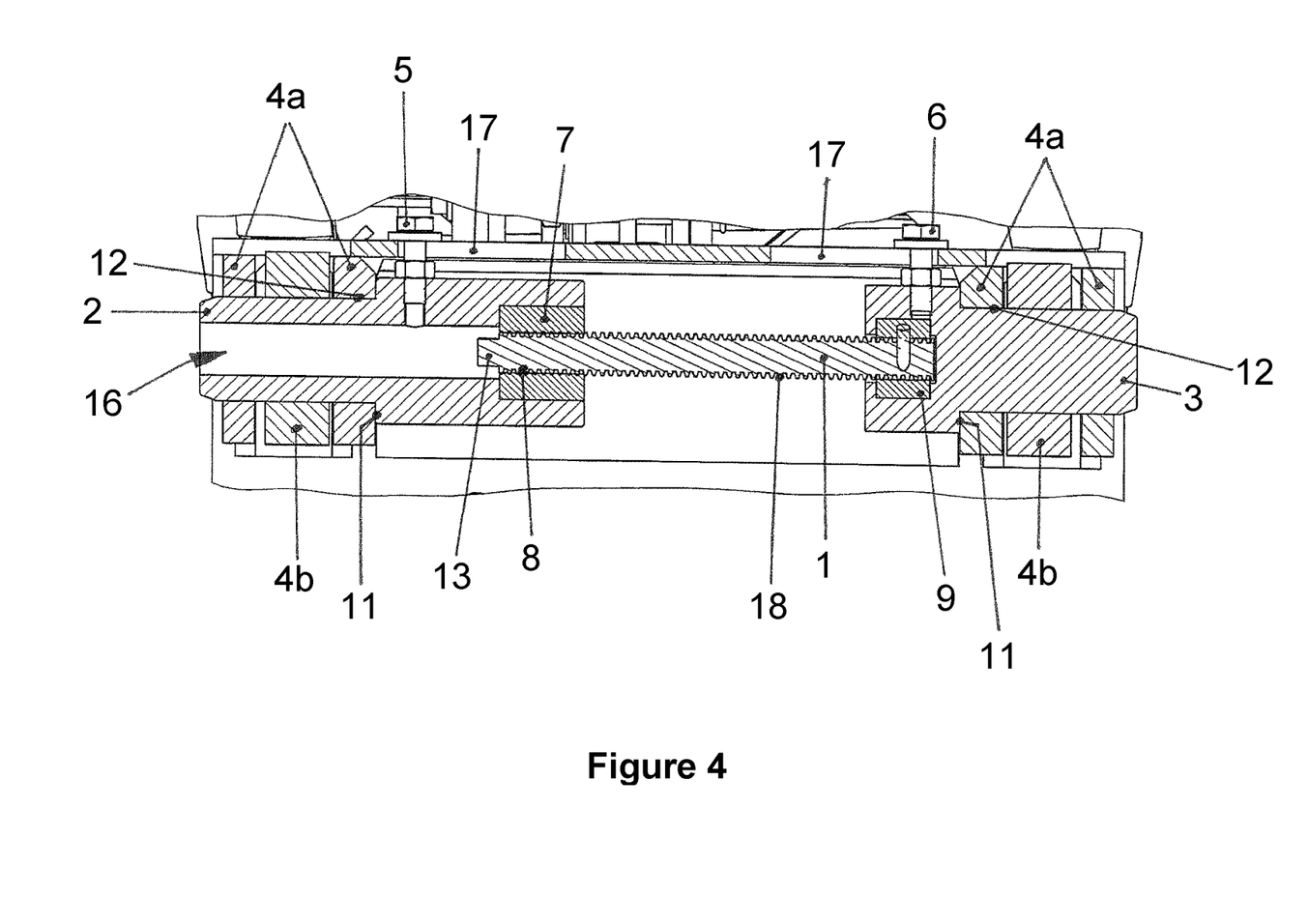
FIG. 4 a detailed view of the bolting device in accordance with the invention from FIGS. 1 and 2.

The bolting device in accordance with the invention, which is already shown in FIG. 2, is shown in detail in FIG. 4. The central spindle element 1, which is embodied as a simple threaded rod, is coupled towards its two ends to bolts 2 and 3 which exhibit the same central longitudinal axis as the spindle element 1. The right-hand bolt 3 is coupled to the spindle element 1 via a bushing 9, which is screwed onto and dowelled to the right-hand end of the spindle, and only exhibits one rotational degree of freedom with respect to the spindle element 1. The spindle element 1 rotates together with the bushing 9 within the bolt 3. A second bolt 2 is coupled to the spindle element 1, by means of another threaded bushing 7, at the opposing end of the spindle element 1. Said threaded bushing 7 is however fixedly connected to the bolt 2, by means of a dowelled or screwed arrangement. A tool interface 13 which is also situated at this end of the spindle element 1 can be reached via the central longitudinal bore 16 through the bolt 2 with the aid of a tool extension.

FIG. 4 demonstrates how, when the spindle element 1 is rotated about its central longitudinal axis, the bolt 3 remains in its axial position with respect to the spindle element 1, whereas the bolt 2 migrates along the spindle element 1 due to the threaded engagement between the inner thread 8 of the bushing 7 and the outer thread 18 of the spindle element 1. As a result, the distance between the bolts 2 and 3 is increased or decreased, depending on the rotational direction. FIG. 4 shows the maximally extended position of the bolting device, in which the circumferential collars 11 of the bolts 2 and 3 abut the fork lugs of the element 4a and thus prevent the bolting device from being driven out any further. A bolting portion 12 which adjoins each of the collars 11 exhibits a circular cross-section and engages with both the fork lugs of the element 4a and the rod lug of the element 4b.

In order to prevent the bolts 2 and 3 from rotating along with the spindle element 1, both bolts 2 and 3 are fixed to one translational degree of freedom along the longitudinal axis of the spindle by proprietary holding devices 5 and 6. In the example shown, the holding devices 5 and 6 consist of screws which are screwed into the bolts 2 and 3 in the radial direction and secured using nuts and which extend through slots 17 on the upper end of the shaft and thus only allow a translational movement of the bolts 2 and 3 which is directed outwards or inwards, wherein the slots 17 can be embodied on either the element 4a or the element 4b and thus define which of the elements 4a or 4b the bolting device remains on after unbolting.

Figure 5:
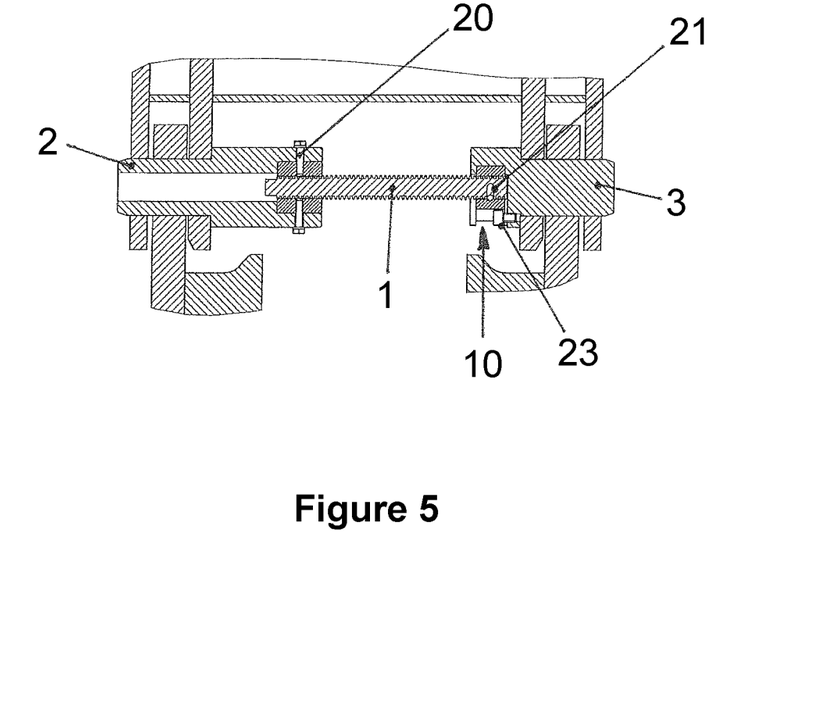
FIG. 5 the bolting device in accordance with the invention, when bolted.

FIG. 5 again shows the maximally extended bolts 2 and 3. It also shows how the bushing 7 (see FIG. 4) is connected to the bolt 2 by means of two screws 20, whereas the bushing 9 (see FIG. 4) is connected to the spindle element 1 via the dowel 21. In order to enable the bushing 9 to be assembled, the bolt 3 comprises a lateral and/or radial window 10 via which the bushing 9 can be inserted into the bolt 3 and held in said position by a screw 23. The spindle element 1 which is both screwed into and dowelled to the bushing 9 is ultimately left with only one rotational degree of freedom with respect to the bolt 3.

Figure 6:
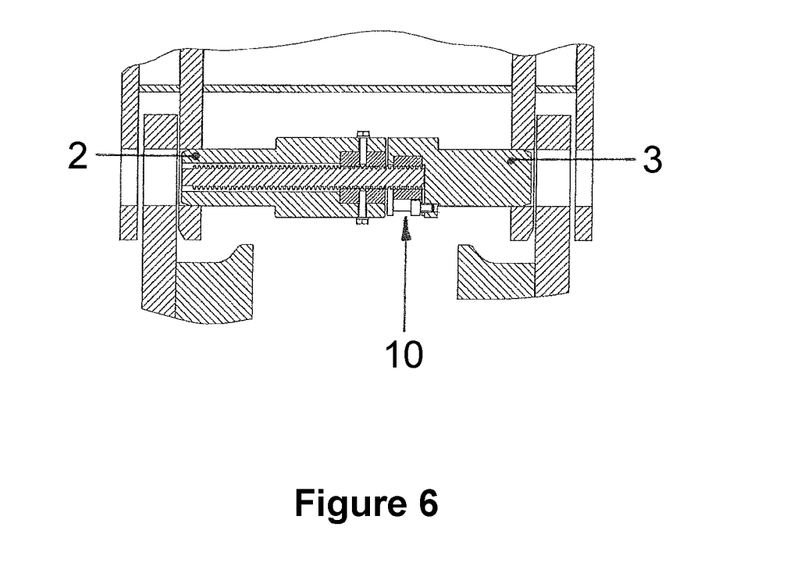
FIG. 6 the bolting device in accordance with the invention, when unbolted.

As shown in FIG. 6, the bolt 2 migrates to the right on the spindle element 1 during unbolting, until it abuts the bolt 3 in the maximally retracted position. It is also shown how the spindle element 1 thus enters the access 16 in the bolt 2. In the example shown, the exterior portions of the bolts 2 and 3 remain in the corresponding inner fork lugs and hold the bolting device, in addition to the holding devices 5 and 6, on the element 4a.

The invention claimed is:

1. A bolting device comprising:
   a first bolt;
   a second bolt; and
   a spindle element having a central longitudinal axis and a threaded portion with a thread extending in a first helical direction, wherein:
   the first bolt and the second bolt are held rotationally secure to each other, and are further coupled to each other via the spindle element,
   at least one of a first longitudinal end and a second longitudinal end of the spindle element comprises a tool interface, and at least one of the first bolt and the second bolt comprises an access to the tool interface which extends along the central longitudinal axis,
   the first bolt is connected via a threaded engagement to the threaded portion of the spindle element adjacent the first longitudinal end thereof such that rotating the spindle element about its central longitudinal axis causes the first bolt to move along the central longitudinal axis, and
   the second bolt is connected to the spindle element at a second longitudinal end thereof via a rotatable bushing, the rotatable bushing mounted on the spindle element and fixed against rotational and axial movement relative to the spindle element, the second bolt comprising a cavity which extends in a radial direction and into which the rotatable bushing is inserted between first and second axial walls thereof, the second bolt encompassing the rotatable bushing between the first axial wall and the second axial wall to retain the rotatable bushing in first and second axial directions along the central longitudinal axis, such that rotational movement of the spindle element causes the rotatable bushing to rotate relative to the second bolt within the cavity and axial movement of the spindle element causes axial movement of the second bolt by transmitting axial forces to the second bolt through the rotatable bushing.

2. The bolting device according to claim 1, wherein the spindle element is arranged coaxially with respect to the first and second bolts.

3. The bolting device according to claim 1, wherein the first bolt comprises a first holding element, and the second bolt comprises a second holding element, and wherein the first and second holding elements extend radially away from the respective bolt and are supported together with the respective bolt on an adjacent stationary structure, thereby holding the respective bolt rotationally secure with respect to the spindle element.

4. The bolting device according to claim 1, further comprising a fixed bushing which is connected, rotationally fixed, to the first bolt and provides a threaded engagement with the threaded portion of the spindle element.

5. The bolting device according to claim 1, wherein the rotatable bushing features one rotational degree of freedom with respect to the second bolt.

6. The bolting device according to claim 1, wherein the first bolt and/or second bolt comprises a collar which adjoins a bolting portion embodied to engage with the elements to be bolted.

7. A crane jib head comprising the bolting device according to claim 1, for bolting a lattice masthead to a head adaptor.

8. A crane jib head comprising:
 a lattice masthead;
 a head adapter; and
 a bolting device for connecting the lattice masthead to the head adapter, the bolting device comprising:
 a first bolt having a bolting portion for engaging the lattice masthead and the head adapter;
 a second bolt having a bolting portion for engaging the lattice masthead and the head adapter; and
 a spindle element having a central longitudinal axis and a threaded portion with a thread extending in a first helical direction, wherein:
 the first bolt and the second bolt are held rotationally secure to each other, and are further coupled to each other via the spindle element,
 at least one of a first longitudinal end and a second longitudinal end of the spindle element comprises a tool interface, and at least one of the first bolt and the second bolt comprises an access to the tool interface which extends along the central longitudinal axis,
 the first bolt is connected via a threaded engagement to the threaded portion of the spindle element adjacent the first longitudinal end thereof such that rotating the spindle element about its central longitudinal axis causes the first bolt to move along the longitudinal axis, and
 the second bolt is connected to the spindle element at a second longitudinal end thereof via a rotatable bushing, the rotatable bushing mounted on the spindle element and fixed against rotational and axial movement relative to the spindle element, the second bolt comprising a cavity which extends in a radial direction and into which the rotatable bushing is inserted between first and second axial walls thereof, the second bolt encompassing the rotatable bushing between the first axial wall and the second axial wall to retain the rotatable bushing in first and second axial directions along the central longitudinal axis, such that rotational movement of the spindle element causes the rotatable bushing to rotate relative to the second bolt within the cavity and axial movement of the spindle element causes axial movement of the second bolt by transmitting axial forces to the second bolt through the rotatable bushing.

9. The crane jib head of claim 8, wherein the bolting device is floatingly mounted with respect to at least one of the lattice masthead and the head adapter.

10. The crane jib of claim 8, wherein the first bolt is held rotationally secure by a first holding element engaged between the first bolt and one of the lattice masthead and the head adapter, and the second bolt is held rotationally secure by a second holding element engaged between the second bolt and one of the lattice masthead and the head adapter.

* * * * *

UNITED STATES PATENT AND TRADEMARK OFFICE
CERTIFICATE OF CORRECTION

PATENT NO. : 10,717,632 B2
APPLICATION NO. : 15/878846
DATED : July 21, 2020
INVENTOR(S) : Nils Ehrentraut et al.

Page 1 of 1

It is certified that error appears in the above-identified patent and that said Letters Patent is hereby corrected as shown below:

In the Specification

1. In Column 4, Line 46, delete "DESCRIPTION" and insert -- DETAILED DESCRIPTION --, therefor.

In the Claims

2. In Column 8, Line 30, in Claim 10, delete "jib" and insert -- jib head --, therefor.

Signed and Sealed this
Tenth Day of November, 2020

Andrei Iancu
*Director of the United States Patent and Trademark Office*